INVENTOR.
NORMAN E. AUBREY

INVENTOR.
NORMAN E. AUBREY

BY

ATTORNEY though filed this application Jan. 9, 1967, Ser.

United States Patent Office 3,509,237
Patented Apr. 28, 1970

3,509,237
ABS GRAFT POLYBLENDS CONTAINING TWO
GRAFT POLYMERS HAVING DIFFERENT
PARTICLE SIZES
Norman E. Aubrey, West Springfield, Mass., assignor to Monsanto Company, St. Louis, Mo., a corporation of Delaware
Continuation-in-part of application Ser. No. 535,962, Mar. 21, 1966. This application Jan. 9, 1967, Ser. No. 619,488
Int. Cl. C08f 41/08, 41/04
U.S. Cl. 260—876
25 Claims

ABSTRACT OF THE DISCLOSURE

There is disclosed a polyblend composition having a matrix of an interpolymer of monovinylidene aromatic hydrocarbon and an unsaturated nitrile, and first and second graft copolymers each having a rubber substrate and a superstrate of an interpolymer of a monovinylidene aromatic hydrocarbon and an unsaturated nitrile. The first and second graft copolymers have an average particle size, based upon number average, of about 0.8 to 2.0 microns and 0.01 to 0.25 micron, respectively. The combined graft copolymers comprise 1.0 to 70.0 percent by weight of the polyblend, and the second graft copolymer comprises about 70.0 to 97.0 percent by weight of the combined graft copolymers.

A process for making such polyblends is disclosed wherein the two graft copolymers are prepared separately and thereafter blended. Preferably, the first graft copolymer is prepared by suspension polymerization and the second graft copolymer by emulsion polymerization. Other components may optionally be included.

CROSS-REFERENCE TO RELATED APPLICATION

The present application is a continuation-in-part of copending application Ser. No. 535,962, filed Mar. 21, 1966, bearing the same title and by the same inventor, now abandoned.

BACKGROUND OF THE INVENTION

As is well known, polyblends of rubbers with styrene/acrylonitrile type interpolymers have advantages in providing compositions of desirable properties including toughness and chemical resistance, as well as providing good formability. Generally, increasing the rubber content is advantageous in increasing the toughness, but some reduction in other properties such as gloss is generally experienced with increase in rubber content.

It is an object of the present invention to provide a novel polyblend of rubber with an interpolymer consisting at least principally of a monovinylidence aromatic hydrocarbon and an unsaturated nitrile which exhibits a highly desirable balance of properties.

It is also an object to provide such a polyblend which is relatively easily and economically formulated and which affords the opportunity for facile tailoring of properties from standard, readily stocked components.

Another object is to provide such a polyblend which has high impact resistance, good gloss and good tensile properties and which affords a high degree of versatility.

Another object is to provide a facile and relatively economical process for preparing such rubber-interpolymer polyblends which permits utilization of existing equipment and techniques for preparation of the grafted rubber components thereof.

SUMMARY OF THE INVENTION

It has now been found that the foregoing and related objects and advantages may be readily attained in a composition comprising a polyblend of (A) a matrix of an interpolymer consisting at least principally of a monovinylidene aromatic hydrocarbon and an unsaturated nitrile; (B) a first graft copolymer having a rubber substrate and a superstrate of an interpolymer consisting at least principally of a monovinylidene aromatic hydrocarbon and an unsaturated nitrile; and (C) a second graft copolymer having a rubber substrate and a superstrate of an interpolymer consisting at least principally of a monovinyilidence aromatic hydrocarbon and an unsaturated nitrile. One of the graft copolymers has an average particle size, based upon number average, of about 0.8 to 2.0 microns and at least 75.0 percent of the particles are in the particle size range of 0.7 to 21.1 microns. The other graft copolymer has an average particle size, based upon number average, of 0.01 to 0.25 micron and at least 75.0 percent of the particles are in the particle size range of 0.005 to 0.30 micron. The two graft copolymers combined comprise 1.0 to 70.0 percent by weight of the total blend and the small particle size copolymer comprises about 70.0 to 96.0 percent of the total weight of the graft copolymers combined.

In determining particle size, a dispersion of the graft copolymer is prepared and an electron microphotograph is taken thereof. Approximately 200 to 1000 particiles should be measured and counted to obtain a representative number average.

The theory of operation is not fully understood, but it is believed that the large rubber graft particles provide a basic degree of toughness which is then extended by the small rubber graft particles in a manner such that the gloss and tensile properties of the composition are maintained at desirable levels. Apparently, the small particles fill spaces between the large particles and enhance the toughness of the blend as well as achieve some homogeneity of rubber graft within the matrix.

THE INTERPOLYMER

The interpolymers of the present invention of both the matrix and the graft superstrates consist at least principally of a monovinylidene aromatic hydrocarbon and an unsaturated nitrile, i.e., such monomers comprise at least 50.0 percent by weight and preferably at least 75.0 percent by weight of the interpolymers. Most desirably, such monomers comprise at least 90.0 percent by weight of the interpolymer and the usual commercial compositions are substantially completely comprised of such monomers although minor amounts, i.e., less than 5.0 percent by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interploymers closely approximately the chemical composition of the interpolymer of the matrix so as to obtain matching of the chemical properties, and, accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymers are acrylonitrile, methacrylonitrile, ethacrylonitrile, and mixtures thereof.

Exemplary of the monomers which may be interpolymerized with the monovinylidene aromatic hydrocarbons and unsaturated nitriles are conjugated 1, 3 dienes, e.g., butadiene, isoprene, etc.; alpha- or beta-unsaturated monobasic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monovinylidene aromatic hydrocarbon or interpolymer thereof.

The polymerizable monomer mixtures contain at least 20 percent by weight of the monovinylidene aromatic monomer and preferably at least 50 percent by weight thereof. They also contain at least 5 percent by weight of the unsaturated nitrile and preferably at least 10 percent by weight thereof. From the standpoint of highly advantageous commercial practice, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

The matrix

As is well known int he art, the polyblend is produced by polymerizing the monomers in the presence of the preformed rubber. It is believed that a portion of the polymer formed grafts onto the preformed rubber since it is generally not possible to extract the rubber from the polymerized mass withh the usual rubber solvents although some of the rubber polymer may not be in actual chemical combination with the polymer.

Since 100 percent grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the ungrafted superstrate, i.e., mass, suspension and emulsion, or combinations thereof. Such techniques are well known and are also described herein with respect to the graft copolymerization reactions.

The rubber substrate

Various rubbers onto which the interpolymer may be grafted during the polymerization in the presence thereof are utilizable as the substrate of the graft copolymer including diene rubbers, ethylenepropylene rubbers, acrylate rubbers, polyisoprene rubbers, and mixtures thereof a well as interpolymers thereof with each other or other copolymerizable monomers.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D–746–52T) of one or more conjugated 1, 3 dienes, e.g., butadiene, isoprene, piperylene, chloroprene, etc. Such rubbers include homopolymers and interpolymers of conjugated 1, 3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2, 4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m-, and p-chlorostyrenes, 2, 4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, cross-linking may present problems in dissolving the rubber in the monomers for the graft polymerization reaction, particularly for a mass or suspension polymerization reaction. In addition, excessive cross-linking can result in loss of the rubbery characteristics. The cross-linking agent can be any of the agents conventionally employed for cross-linking diene rubbers, e.g., divinylbenzene, diallyl maleate, diallyl fumarate diallyl adipate, allyl acrylate, allyl methacrylate, diacryates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene Various techniques are customarily employed for polymerizing rubber monomers including mass, suspension and emulsion polymerization. Emulsion polymerization can be used to produce a latex emulsion which is useful as the base for emulsion polymerization of the graft copolymer.

Graft polymerization processes

The graft copolymers are prepared by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 70–150:100. With graft ratios above 30:100, a highly desirable degree of improvement in various properties generally is obtained.

To minimize requirements for separate equipment, the same process of polymerization desirably may be utilized to prepare both sizes of rubber graft components, as well as ungrafted interpolymer or crystal for use as the matrix when required. Generally, the particle sizes of the graft copolymer can be varied by varying the size of the rubber substrate employed. For example, a rubber latex which will usually have a relatively small particle size, i.e., less than about 0.2 micron, may be creamed through the use of polyvalent metal salts to obtain agglomeration or coagulation of a number of the small rubber particles into a larger mass. During the grafting reaction, the polymerizing monomers will graft onto this agglomerate and thus provide a graft copolymer of larger size. In addition, seeding techniques during polymerization of the rubber and/or during the polymerization of the graft copolymers may be utilized to vary the size of the particles thus produced.

Chain transfer agents or molecular weight regulators also exhibit an effect upon the size of the graft copolymer produced, particularly in mass and suspension polymerization reactions. The effect of the rate of addition of chain transfer agents will be referred to hereinafter. The viscosity of the polymerizing mixture also tends to affect the condensate particle size of the polymers.

To some extent, cross linking and the ratio of the superstrate to substrate in the graft copolymer tend to affect the particle size of the graft copolymers by reason of an apparent tendency for the particles to aggregate or agglomerate as the amount of grafting and/or cross linking becomes minor.

The graft copolymer particles produced in various polymerization processes may be agglomerated through various techniques in the recovery thereof such as during the coagulation and/or dewatering techniques. Heat and other conditions of polymerization such as catalysts monomer ratios, rate of addition of monomers, etc., also tend to affect the particle size of the graft copolymers produced thereby.

However, different polymerization techniques may be utilized to produce the two different sizes of graft copolymer particles by reliance upon inherent process characteristics. In practice, it has been found desirable to utilize an emulsion polymerization process to form the smaller graft particles asd a mass-suspension polymerization process to form the larger particles since highly spherical particles are produced within a relatively narrow size range. Generally, the graft copolymerization inherently produces cross-linking, and this may be enhanced by selection of process conditions to ensure discreteness of the graft copolymer particles.

It will be appreciated that both the large and small particle graft copolymer components may be provided by mixtures of two or more separately formed graft copolymers of distinctive properties to vary still further the benefits of the present invention. For example, the small particle graft copolymer may be a cocoagulation of two different graft copolymer latices having different superstrate to substrate ratios, or the large particle graft copolymers may be formed by two different suspension products with varying superstrate to substrate ratios.

Mass-suspension polymerization process

In an advantageous combination mass-suspension polymerization process, the monomers, rubber substrate and catalyst (as well as other optional components) are charged to a suitable reactor and thereafter polymerized en masse by heating at a temperature of about 75 to 125° centigrade over a period of abotu one to forty-eight hours and at a pressure of 1 to 100 pounds per square inch until a portion of the monomer has been polymerized, generally about 15.0 to 50.0 percent by weight thereof with conventional stirring to aid heat transfer during reaction. The time for this partial polymerization will vary depending upon the catalyst, pressures and temperatures employed and the particular monomers and ratios thereof. Generally, it is preferred to conduct such a prepolymerization process to convert approximately 20.0 to 35.0 percent by weight of the monomer.

Any free radical generating catalyst may be used in the practice of this invention including actinic radiation. It is preferable to incorporate a suitable catalyst system for polymerizing the monomer such as the conventional monomer-soluble peroxy and perazo compounds. Exemplary catalyst are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5 di(tert-butylperoxy)hexane, 2,5-dimethyl-2,5-di(tert-butylperoxy)hexyne-3, tert-butyl hydroperoxide, cumene hydroperoxide, p-methane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 1.0 percent by weight of the polymerizable material. In addition, it may be desirable to include relatively small amounts of antioxidants or stabilizers such as the conventional alkylated phenols, although these may be added during or after polymerization.

The syrup provided by the partially polymerized formulation is then admixed with water in the presence of a suspending agent such as the acrylic acid-acrylate interpolymers of U.S. Patent No. 2,945,013 granted July 12, 1960 and U.S. Patent No. 3,051,682 granted Aug. 28, 1962. Secondary dispersing aids may also be added to obtain the desired suspension of the syrup in the water. The suspending agent is desirably added to the water although it may be added to the monomers ab initio or during initial polymerization. This suspension is subjected to agitation and heated at a temperature of about 75 to 200° centigrade for a period of one to forty-eight hours to obtain substantially complete polymerization of the monomers therein. Preferably, such further polymerization is carried out at a temperature of about 100 to 170° centigrade for a period of one to twenty hours depending upon the catalyst and the amount thereof employed. After substantial completion of the polymerization reaction, any unreacted monomers or volatile residue components are stripped and the polymer beads are recovered by centrifuging, washed and dried.

Alternatively, the monomers and rubber substrate may be suspended in water initially and the entire polymerization reaction conducted in suspension. In either process, additional monomers, catalyst and other components may be introduced into the polymerizable formulation at various stages of the polymerization process as so desired.

Emulsion polymerization process

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and perazo catalysts and the resultant latex may be used as the aqueous medium with which the interpolymer monomers are admixed. In this manner, the catalyst for the rubber polymerization may function in whole or in in part as the catalyst for the graft polymerization. However, additional catalyst may be added at the time of graft polymerization. Exemplary of suitable peroxy catalysts are the alkali metal peroxides, persulfates, perborates, peracetates, and percarbonates, and hydrogen peroxide. If so desired, the catalysts may be activated to form redox systems. In addition, it may be advantageous to include an oil-soluble catalyst such as those hereinbefore identified for mass-emulsion polymerization processes. However, other free-radical generating catalysts may be employed such as actinic radiation.

Chain transfer agents and other polymerization modifiers may desirably be included and it is generally advantageous to incorporate a higher alkyl mercaptan, such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20 to 100° centigrade with agitation. Pressures of 1 to 100 pounds per square inch may be employed and the monomers and/or additional catalyst may be added incrementally or continuously over a portion of the reaction cycle. Polymerization is continued until substantially all, i.e. more than 90 percent, of the monomers have reacted. The remaining monomers and other volatile components are then distilled from the latex, which is then dewatered, washed and dried.

Particle size of the emulsion graft particles may be varied by seeding, emulsifying agent concentration, agitation, rubber-size coagulation techniques, etc. Agglomeration of particles may also be employed.

Graft particle size

For purposes of the present invention, the average particle size is based upon the number average of the particles of the several sizes in each graft copolymer. An electron photomicrograph of a dispersion is obtained and the particle size of 200–1000 particles is determined to obtain an average particle size.

As previously indicated, one rubber graft has an average particle size of 0.01 to 0.25 micron with more than 75 percent of the particles within the range of 0.005 to 0.30. The preferred compositions have an average particle size in the range of about 0.10 to 0.20 micron.

The other rubber graft has an average particle size in the range of 0.80 to 2.0 microns with more than 75 percent of the particles within the range of 0.7 to 2.1 microns in size. As the average particle size increases within the above range, the weight percentage of the large particle size rubber graft required for comparison impact strength decreases as may be seen in FIGURE 1 of the attached drawings. However, an increase of the average particle size above 2.0 microns tends to minimize the highly effective cooperative action of the large and small particles and thereby to diminish gloss excessively and begin to affect adversely other properties. As the particle size of the large particle graft copolymer decreases below about 0.9 micron, the amount thereof required for comparable impact strength rapidly increases and it becomes more difficult to maintain the optimum balance of properties. Accordingly, the compositions of the present invention utilize a large particle graft copolymer having an average diameter of not less than about 0.8 micron. The preferred compositions utilize a large particle graft copolymer having an average particle size of about 0.9 to 1.4 microns with more than 75 percent of the particles within the range of 0.8 to 1.5 microns.

Formation of the blend

The two graft copolymers may be blended in the ungrafted interpolymer matrix by various techniques. In the preferred techniques, the graft polymers are extrusion blended or mill rolled with or without the addition thereto of additional ungrafted interpolymer depending upon the amount of ungrafted interpolymer in the feedstocks providing the rubber grafts and the total rubber graft content desired in the blend. Alternatively, a mixed latex of the different particle size grafts may be prepared and coagulated to provide crumb containing the rubber grafts of the desired two particle size ranges in the desired proportions.

Generally, the blends may contain 1.0 to 70.0 percent by weight of the two rubber grafts combined. Increasing the total amount of rubber graft while maintaining the ratio of large particle graft to total graft constant generally increases the Izod impact strength of the composition but rapidly increases the viscosity of the blend and decreases the tensile stress at yield and at fail and the tensile modulus. Accordingly, the preferred blends contain about 10.0 to 50.0 percent by weight of the combined rubber grafts, and most desirably about 20.0 to 40.0 percent by weight.

Since it is desirable to obtain a balancing of properties and the size of the large particles generally has the most significant effect upon the properties at a constant total rubber content, the preferred compositions contain a smaller ratio of the large particle graft to total graft as the particle size thereof increases. The optimum weight percentage of the large particle graft based upon total graft copolymer content as the particle size of the large particle increases is shown in the graph of FIGURE 2 of the attached drawings.

As can be seen from the series of iso-impact curves in FIGURE 3, the amount of total graft in the composition required to obtain a given impact strength increases as the percentage of the large particle graft in the total graft is reduced. In the graph of FIGURE 4, the effect on gloss of varying the percentage of the large particle graft in the total graft can be seen. As evidenced, gloss generally is adversely affected by increase in the ratio of the large particle graft to total graft. Accordingly, the ratio of large particle graft copolymer, to total graft copolymer in the compositions of the present invention is not more than 30:100.

In view of the effect of varying the size of the large particle graft and its percentage of the total rubber content, the compositions desirably contain approximately the ratios set forth in Table 1 below and represented in FIGURE 2 as stated above.

TABLE 1

| Size Large Particle Graft (Number Average), Microns | Weight of Large Particle Graft / Weight of Total Graft | |
|---|---|---|
| | Range | Optimum |
| 1.5 | 3–14 | 6 |
| 1.1 | 4–16 | 8 |
| 0.9 | 5–20 | 10 |
| 0.8 | 8–30 | 15 |

It will be readily appreciated that optional components may be added to the composition depending upon the intended use and nature thereof, such as, for example, fillers and pigments. Generally, it is necessary to incorporate stabilizers and antioxidants to prevent degradation of the graft copolymer and oftentimes of the interpolymer of the matrix. Although the stabilizers and antioxidants may be incorporated at the time of final blending, generally it is most advantageous to incorporate these components into the graft copolymers after they are formed so as to minimize any tendency for degradation or oxidation during processing and storage.

The present process permits the two graft copolymers to be prepared separately and the matrix interpolymer to also be prepared separately with the several components being storable for extended periods of time and blended only as required to form the desired composition. Thus, the rubber level or the balance of properties can be varied by selection of readily variable percentages of the several components.

If so desired, minor amounts of ungrafted rubber may be blended into the present compositions to permit some reduction in the amounts of graft copolymer required but should not exceed about 10 percent by weight of the combined graft copolymers to avoid undesirable reduction in properties.

DESCRIPTION OF THE PREFERRED EMBODIMENTS

Figure 1:
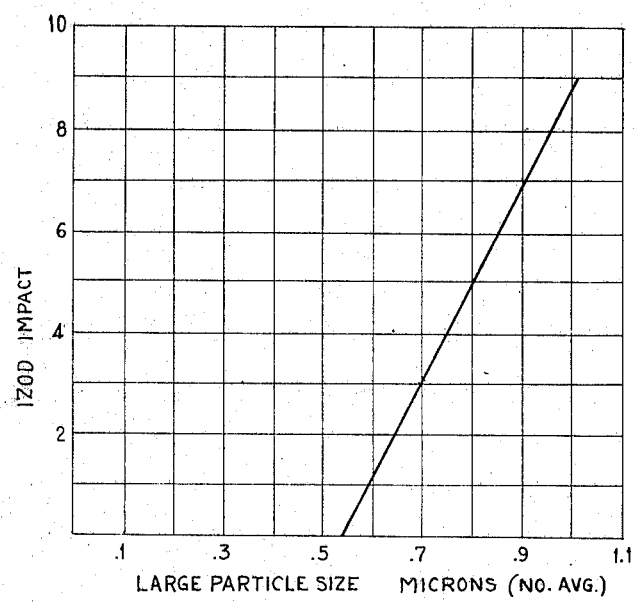
FIGURE 1 is a graph representing the effect of particle size of the large rubber graft component on impact strength of the composition.
Figure 2:
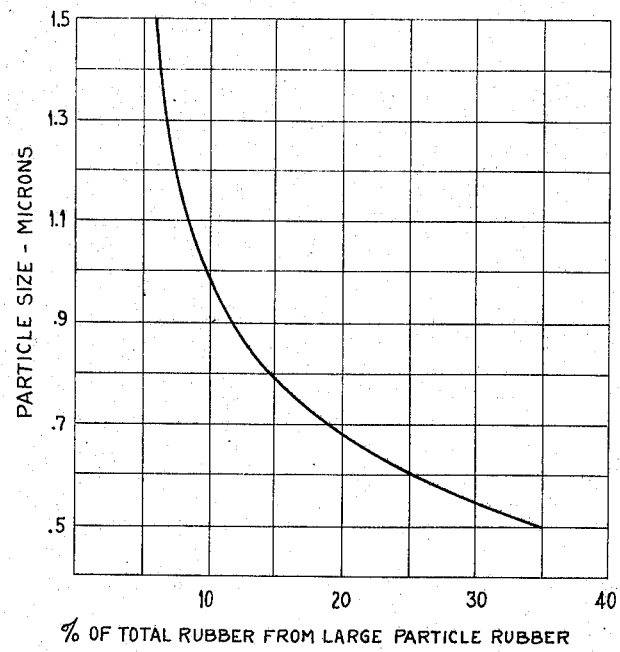
FIGURE 2 is a graph plotting the preferred percentages of the larger rubber graft components against the particle size thereof in the compositions of the present invention.

Exemplary of the efficacy of the present invention are the following specific examples wherein all parts are parts by weight unless otherwise indicated.

EXAMPLE 1

Part A

To a 250.0 parts of a latex of butadiene/acrylonitrile copolymer (93:7) containing 50.0 percent solids and approximately 1.0 part of rubber reserve soap as an emulsifier were added 70.0 parts water, 1.0 part rubber reserve soap and 1.0 part potassium persulfate.

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulant was then washed and dried. The resulting graft copolymer has a superstrate to substrate ratio of about 0.9:1.0 and a particle size (number average) of about 0.14 micron.

Part B

Fourteen parts of a soluble butadiene rubber were dissolved in 26.0 parts of acrylonitrile and 60.0 parts styrene. There were added thereto 0.07 part of a mixture of tert-butyl peracetate, 0.05 part di-tert-butyl peroxide and stabilizers. The mixture was heated to 100° centigrade with stirring. Terpinolene was added as a chain transfer agent over a period of approximately five hours in an amount of about 0.1 part per hour for approximately five hours, at the end of which time an additional 0.4 part was added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0 percent solution in water at 25° centigrade. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

Part C

To an extrusion blender were added 40.0 parts of the graft copolymer of Part A, 43.0 parts of the graft copolymer of Part B and 17.0 parts of styrene/acrylonitrile copolymer (70:30). Thus, a composition was obtained containing about 38.0 parts of the two graft copolymers, and the large particle graft copolymer comprised about 30.0 percent by weight of the total amount of graft copolymers.

Injection moldings were prepared from the polyblend, and tests conducted thereon to determine the physical properties thereof which are set forth below:

Izod impact—7.9 foot pounds
Hunter gloss (peak)—62
Shrinkage—20 percent
Tensile impact strength—152 foot pounds/in.$^2$
Tensile stress at yield—5480 p.s.i.
Tensile stress at fail—4630 p.s.i.
Elongation at fail—54 percent
Tensile modulus—2.6×10$^{-5}$ p.s.i.

Accordingly, it can be seen from the above test data that the polyblend thus produced has a highly desirable balance of properties making it suitable for a wide variety of applications.

EXAMPLE 2

The procedure of Example 1 was substantially repeated except that the rate of terpinolene addition in the procedure of Part B was varied from a rate of about 0.05 part per hour to about 0.2 part per hour for a series of individual batches. At the end of about five hours, sufficient terpinolene was added to provide a total terpinolene addition of 0.9 part.

Increasing the rate of terpinolene addition tends to increase the particle size of the graft copolymer. From the polyblends produced from the several batches, moldings were prepared and Izod impact tests were conducted thereon. The data indicating the effect of varying the particle size of the large particle rubber graft while maintaining the ratio of the large particle rubber graft to total graft is set forth in FIGURE 1.

EXAMPLE 3

The procedure of Example 1 was substantially repeated except that a lesser amount of catalyst and terpinolene were added during the emulsion polymerization procedure of Part A. The resultant graft copolymer has a superstrate to substrate ratio of about 1.1:1.0 and an average particle size of about 0.08 micron.

In addition, the mass-suspension polymerization process of Part B was modified slightly to provide a ratio of styrene to acrylonitrile in the charge of 74:26. The ratio of the styrene/acrylonitrile in the superstrate was about 70:30.

Figure 4:
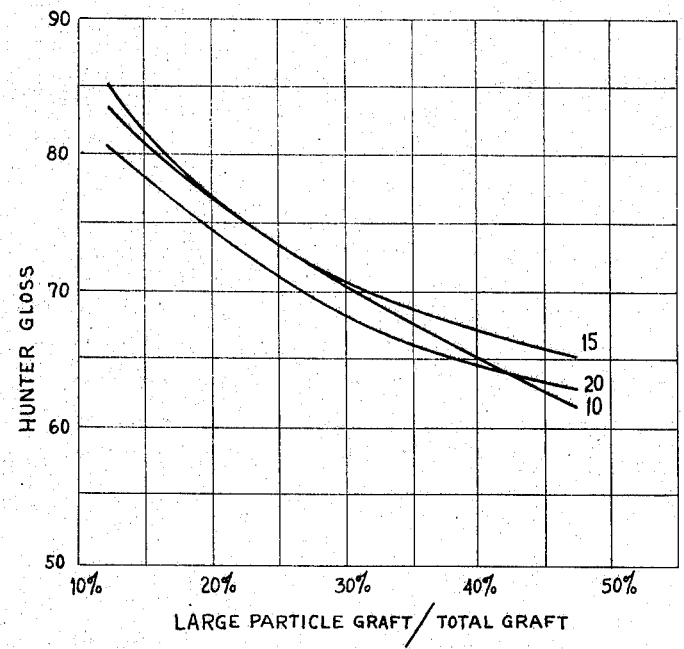
FIGURE 4 is a graph representing the effect of variations in the ratio of the two rubber graft components upon the gloss of moldings produced from the composition.

A series of formulations was prepared utilizing the graft copolymers in different ratios and also in which the total amount of rubber substrate present in the formulations was varied so as to provide a first series in which the total rubber level was 10.0 percent by weight of the total composition, a second series in which the total rubber level was 15.0 percent by weight, and a third series in which the total rubber was 20.0 percent by weight. The gloss of the compositions thus prepared was determined, and the data is set forth in FIGURE 4 of the drawings.

EXAMPLE 4

Figure 3:
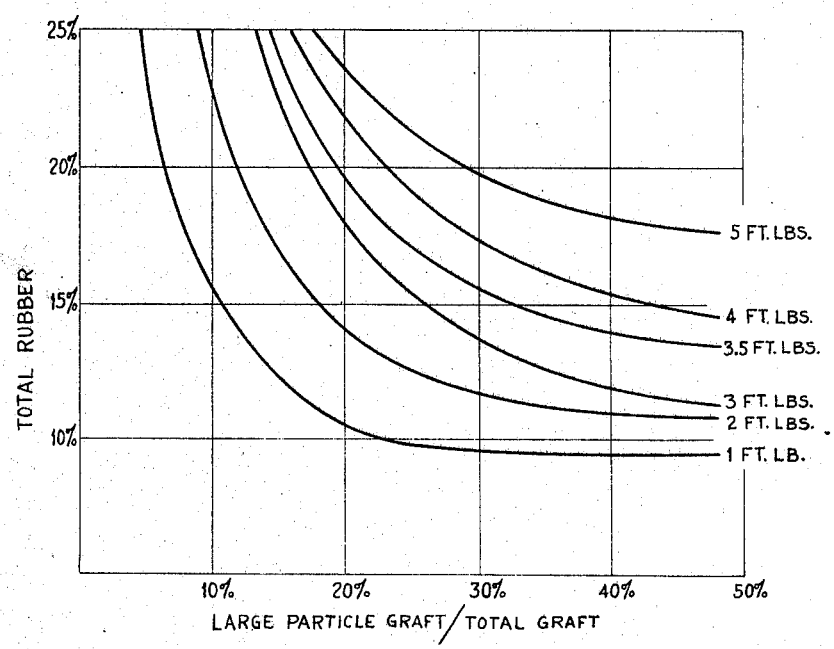
FIGURE 3 is a graph of iso-impact curves showing the effect of varying the ratio of the two rubber graft components.

The procedure of Example 3 was substantially repeated, but a series of formulations was prepared from the two graft copolymers wherein the percentage of the large particles in the total graft copolymer was increased and wherein the total rubber content of the formulations was also varied. The Izod impact values of the series of formulations obtained therefrom are plotted in the graph in FIGURE 3 of the drawings. For purposes of this graph, the vertical base line shows the percentage of rubber substrate in the total composition.

EXAMPLE 5

The graft copolymers of Example 3 were blended in a procedure similar to that described in Example 1 so as to obtain a composition in which the rubber substrate constituted about 24.0 percent by weight thereof. The ratio of the large particle rubber graft to total amount of rubber graft was 15.0:100.0.

A series of physical tests was conducted upon this composition and the results are set forth below:

Izod impact—6.5 foot pounds
Hunter gloss (peak)—60
Shrinkage—22.5 percent
Tensile impact strength—236 ft. lbs./sq. in.
Tensile stress at yield—5400 p.s.i.
Tensile stress at fail—4020 p.s.i.
Elongation at fail—43.2 percent
Tensile modulus—$2.56 \times 10^{-5}$

EXAMPLE 6

The procedure of Example 1 was substantially repeated except that two emulsion graft copolymers were prepared and blended with the suspension graft copolymer.

Part A

To 250 parts of a latex of butadiene/acrylonitrile copolymer (93:7) containing approximately 45 percent solids and 3.25 parts of rubber reserve soap as an emulsifier were added 330.0 parts of water and 0.3 part of potassium persulfate.

A mixture was made of 112.0 parts styrene, 48.0 parts acrylonitrile and 1.3 parts terpinolene which was added to the emulsion continuously over a period of about six hours while the reactor was subjected to polymerization conditions.

During the polymerization cycle, the temperature was maintained at about 65 to 80° centigrade, and the pressure at about 0 to 15 p.s.i.g. with the total cycle being approximately eight hours. Equal additions of rubber reserve soap 0.5 part each were added to the polymerizing mixture at three hours and at four hours after the start of the cycle. Additional persulfate catalyst was added in five equal amounts of 0.13 part each after periods of one, two and one-fourth, three and one-half, four and three-fourths and six hours. It was found that the latex contained a graft copolymer having a superstrate to substrate ratio of about 80:100 and a particle size (number average) of 0.13 micron.

Part B

A second graft copolymer latex was prepared utilizing a butadiene/styrene rubber substrate (90:10). To a latex containing 100.0 parts of rubber and about 6.0 parts soap and 0.2 part potassium persulfate was added 50.0 parts of a mixture of styrene and acrylonitrile monomers (80:20) over a period of about one and one-half hours. During the polymerization cycle, the temperature ranged from 50 to 70° Centigrade and the pressure ranged from 0 to 15 p.s.i.g. After polymerization had been completed, the graft copolymer was found to have a superstrate to substrate ratio of about 37:100 and to have a particle size of about 0.05 micron (number average).

Part C

The latex of Part A was admixed with the latex of Part B in a ratio of 943:57, and the combined latex was coagulated, washed and dried to recover a rubber crumb.

Thereafter, 55.0 parts of the crumb produced above were blended with 18.5 parts of a suspension graft copolymer produced in a manner substantially as indicated in Part B of Example 1 and 26.5 parts of styrene/acrylonitrile copolymer (70:30). Injection moldings were prepared from the resulting polyblend and tests were conducted thereon to determine the physical properties which are set forth in the table below.

Izod impact—6.7 foot pounds/inch
Hunter gloss (peak)—84
Shrinkage—17.3 percent
Tensile stress at yield—5200
Heat distortion temperature—83° centigrade
Yellowness index—47.4

Thus, it can be seen from the foregoing specification and specific examples, as well as the attached drawings, that the present invention provides a composition having properties which may be readily varied through variation in the relative amounts of the two graft components and the total amount of the graft components combined in the composition. By selecting optimum values, the compositions exhibit an extremely and highly desirable balance of properties. It can be seen that the present invention affords the opportunity for facile tailoring of properties from standard readily stocked components which may be blended with each other and with ungrafted interpolymer providing the matrix so as to provide a wide range of compositions. As will be readily appreciated, existing equipment can be employed for preparing the rubber graft components and the interpolymer matrix, and by proper variation in the feedstocks and/or the polymerization and/or recovery processes, it is possible to obtain the graft copolymers of both sizes from the same equipment. Accordingly, the processes and compositions of the present invention are relatively economical and facile to employ.

It is obvious that many variations can be made in the processes set forth without departing from the spirit and scope of this invention.

Having thus described the invention, what is claimed is:
1. A composition comprising a polyblend of: (A) a matrix of an interpolymer consisting at least principally of a monovinylidene aromatic hydrocarbon and an ethylenically unsaturated nitrile; (B) a first graft copolymer having a graftable rubber substrate containing a diene rubber-forming monomer component and a superstrate of an interpolymer consisting at least principally of a monovinylidene aromatic hydrocarbon and an ethylenically un- saturated nitrile, said first graft copolymer having an average particle size, based upon number average, of about 0.8 to 2.0 microns, said first graft copolymer having at least 75.0 percent of the particles of a size within the range of 0.7 to 2.1 microns; and (C) a second graft copolymer having a graftable rubber substrate containing a diene rubber-forming monomer component and a superstrate of an interpolymer consisting at least principally of a monovinylidene aromatic hydrocarbon and an ethylenically unsaturated nitrile, said second graft copolymer having an average particle size, based upon number average, of 0.01 to 0.25 micron, said second graft copolymer having at least 75.0 percent of the particles in the particle size range of 0.005 to 0.30 micron, said first and second graft copolymers having a superstrate:substrate ratio of 10–250:100 and comprising 1.0 to 70.0 percent by weight of said polyblend, and said second graft copolymer comprising about 70.0 to 97.0 percent of the total weight of said first and second graft copolymers.

2. The composition of claim 1 wherein said monovinylidene aromatic hydrocarbon of said interpolymers of the matrix and graft copolymer superstrates is styrene.

3. The composition of claim 1 wherein said unsaturated nitrile of said interpolymers of the matrix and graft copolymer superstrates is acrylonitrile.

4. The composition of claim 1 wherein the rubber substrate of said graft copolymers contains at least about 75 percent by weight of conjugated diene 1,3-rubber forming monomer.

5. The composition of claim 1 wherein said monovinylidene aromatic hydrocarbon and unsaturated nitrile comprise at least 75.0 percent by weight of the interpolymers of the graft copolymer superstrates and matrix.

6. The composition of claim 1 wherein said first graft copolymer has an average particle size of about 0.9 to 1.4 microns and wherein said second graft copolymer has an average particle size of about 0.10 to 0.20 micron.

7. The composition of claim 1 wherein said graft copolymers comprise about 10.0 to 50.0 percent by weight of said polyblend.

8. The composition of claim 1 wherein said first graft copolymer has an average particle size and is present in the composition as follows—

Average particle size, microns:   Percent of total graft
   1.2–2.0 ---------------------------------- 3–14
   1.0–1.2 ---------------------------------- 4–16
   0.9 -------------------------------------- 5–20
   0.8 -------------------------------------- 8–30

9. A composition comprising a polyblend of: (A) a matrix of an interpolymer consisting at least principally of a monovinylidene aromatic hydrocarbon and an ethylenically unsaturated nitrile; (B) a first graft copolymer having a rubber substrate containing at least about 75 percent of a conjugated 1.3-diene rubber forming monomer and a superstrate of an interpolymer consisting at least principally of a monovinylidene aromatic hydrocarbon and an ethylenically unsaturated nitrile, said first graft copolymer having an average particle size, based upon number average, of about 0.9 to 1.2 microns, said first graft copolymer having at least 75.0 percent of the particles of a size within the range of 0.8 to 1.4 microns; and (C) a second graft copolymer having a rubber substrate containing at least about 75 percent of a conjugated 1.3-diene rubber forming monomer and a superstrate of an interpolymer consisting at least principally of a monovinylidene aromatic hydrocarbon and an ethylenically unsaturated nitrile, said second graft copolymer having an average particle size, based upon number average of about 0.10 to 0.20 micron, said second graft copolymer having at least 75.0 percent of the particles in the particle size range of 0.05 to 0.25 micron, said first and second graft copolymers having a superstrate:substrate ratio of 10–250:100 and comprising 10.0 to 50.0 percent by weight of said polyblend, and said second graft copolymer comprising about 80.0 to 96.0 percent of the total weight of said first and second graft copolymers.

10. The composition of claim 9 wherein said monovinylidene aromatic hydrocarbon of said interpolymers of the matrix and graft copolymer superstrates is styrene and said unsaturated nitrile is acrylonitrile.

11. The composition of claim 9 wherein said monovinylidene aromatic hydrocarbon and unsaturated nitrile comprise at least 75.0 percent by weight of the interpolymers of the graft copolymer superstrates and matrix.

12. The composition of claim 9 wherein said graft copolymers have a superstrate to substrate ratio of 50.0 to 200.0:100.0.

13. The composition of claim 9 wherein said first graft copolymer has an average particle size and is present in the composition as follows—

Average particle size, microns:   Percent of total graft
   1.2–2.0 ---------------------------------- 3–14
   1.0–1.2 ---------------------------------- 4–16
   0.9 -------------------------------------- 5–20

14. The composition of claim 9 wherein said monovinylidene aromatic hydrocarbon of said interpolymers of the matrix and graft copolymer superstrates is styrene and wherein said unsaturated nitrile of said interpolymers is acrylonitrile and wherein said styrene and acrylonitrile comprise at least 75.0 percent by weight of the interpolymers of said graft copolymer superstrates and matrix.

15. In a process for preparing a polyblend, the steps comprising: (A) polymerizing a first polymerizable mixture containing a monomer formulation and a prepolymerized graftable rubber containing a diene rubber-forming monomer component to graft at least a portion of the polymerizing monomers upon said rubber and provide a first graft copolymer with a superstrate:substrate ratio of 10–250:100 and having an average particle size, based upon number average, of about 0.8 to 2.0 microns, said first graft copolymer having at least 75.0 percent of the particles of a size within the range of 0.7 to 2.1 microns, said monomer formulation consisting at least principally of a monovinylidene aromatic hydrocarbon and an ethylenically unsaturated nitrile; (B) polymerizing a second polymerizable mixture containing a monomer formulation and a prepolymerized graftable rubber containing a diene rubber-forming monomer component to graft at least a portion of the polymerizing monomers upon said rubber and provide a second graft copolymer with a superstrate:substrate ratio of 10–250:100 and having an average particle size, based upon number average, of about 0.01 to 0.25 micron, said second graft copolymer having at least 75.0 percent of the particles of a size within the range of 0.005 to 0.30 micron, said monomer formulation consisting at least principally of a monovinylidene aromatic hydrocarbon and an ethylenically unsaturated nitrile; and (C) blending said first and second graft copolymers with ungrafted interpolymer consisting at least principally of a monovinylidene aromatic hydrocarbon and an ethylenically unsaturated nitrile to provide a polyblend wherein said graft copolymers comprise 1.0 to 70.0 percent by weight thereof, and wherein said second graft copolymer comprises about 70.0 to 97.0 percent of the total weight of said first and second graft copolymers.

16. The process of claim 15 wherein said monovinylidene aromatic hydrocarbon of said monomer formulations is styrene.

17. The process of claim 15 wherein said unsaturated nitrile of said monomer formulations is acrylonitrile.

18. The process of claim 15 wherein the rubber of said first and second mixtures is selected from the group consisting of diene rubber polymers containing at least 75.0 percent by weight of a conjugated 1,3-diene rubber forming monomer.

19. The process of claim 15 wherein said monovinylidene aromatic hydrocarbon and unsaturated nitrile comprise at least 75.0 percent by weight of the monomer formulations of said first and second mixtures.

20. The process of claim 15 wherein said first and second graft copolymers have a superstrate to substrate ratio of 50.0 to 200.0:100.0.

21. The process of claim 15 wherein said first graft copolymer has an average particle size of about 0.9 to 1.4 microns and wherein said second graft copolymer has an average particle size of about 0.10 to 0.20 micron.

22. The process of claim 15 wherein said graft copolymers comprise about 10.0 to 50.0 percent by weight of said polyblend.

23. The process of claim 15 wherein said first graft copolymer has an average particle size and is present in the composition as follows—

| Average particle size, microns: | Percent of total graft |
|---|---|
| 1.2–2.0 | 3–14 |
| 1.0–1.2 | 4–16 |
| 0.9 | 5–20 |
| 0.8 | 8–30 |

24. The process of claim 15 wherein an ungrafted interpolymer consisting at least principally of a monovinylidene aromatic hydrocarbon and an unsaturated nitrile is added to said first and second graft copolymers and is blended therewith during said blending step.

25. The process of claim 15 wherein said monovinylidene aromatic hydrocarbon of said monomer formulations is styrene and wherein said unsaturated nitrile of said formulations is acrylonitrile and wherein said styrene and acrylonitrile comprise at least 75 percent by weight of the interpolymers of said graft superstrates of said graft copolymers.

References Cited

UNITED STATES PATENTS

| | | | |
|---|---|---|---|
| 3,288,887 | 11/1966 | Yoshino et al. | 260—880 |
| 3,370,105 | 2/1968 | DeBell et al. | 260—880 |
| 3,170,964 | 2/1965 | Grabowski | 260—876 |
| 3,267,175 | 8/1966 | Grabowski | 260—880 XR |

FOREIGN PATENTS

| | | |
|---|---|---|
| 1,009,655 | 11/1965 | Great Britain. |
| 1,013,393 | 12/1965 | Great Britain. |

MURRAY TILLMAN, Primary Examiner

K. E. FUFFNER, Assistant Examiner

U.S. Cl. X.R.

260—880